Jan. 16, 1968    E. M. BECKER, JR    3,363,854
STRIP CHART VIEWER
Filed Aug. 2, 1965    2 Sheets-Sheet 1

INVENTOR.
EARL M. BECKER JR.
BY Christy, Parmelee &
Strickland
ATTORNEYS.

Jan. 16, 1968  E. M. BECKER, JR  3,363,854
STRIP CHART VIEWER

Filed Aug. 2, 1965  2 Sheets-Sheet 2

INVENTOR.
EARL M. BECKER JR.

BY Christy, Parmelee +
Strickland
ATTORNEYS.

United States Patent Office 3,363,854
Patented Jan. 16, 1968

3,363,854
STRIP CHART VIEWER
Earl M. Becker, Jr., 648 Princeton Blvd.,
Pittsburgh, Pa. 15221
Filed Aug. 2, 1965, Ser. No. 476,477
4 Claims. (Cl. 242—67.4)

ABSTRACT OF THE DISCLOSURE

A device especially designed for the reading of strip charts produced by automatic recorders. These charts are formed of paper and come in a wide variety of widths and lengths, and they are wound on cardboard cores of a variety of diameters. An arrangement at each end of the device is provided in which the distance between the flanged wheels may be adjusted by sliding one of the flanged wheels along the spindle to provide for charts of different widths, and in which the core plugs in the flanged wheels may be removed and interchanged with core plugs of different diameters to provide for cores of different diameters whereby strip charts of different widths and having cores of different diameters may be wound from one end of a viewer over a supporting table to the other end of the viewer, with the paper firmly supported between the two ends on a supporting panel which permits marking to be made on the charts where desired. The strip chart is moved by turning a crank always in one direction with a pulley drive so arranged that when the crank is moved axially, one of two belts is driven to move the chart in one direction or the other.

---

This invention is for a viewing device for use in viewing strip record charts such as are used in various recording instruments or other elongated charts.

Recording instruments or meters of various kinds are extensively used wherein a recording pen responsive to some variable condition, such for example as pressure, or temperature, electric current, or some other variable, traces a line on a strip of moving chart paper that is usually moved by a clock mechanism so that the data being recorded can be co-related to a particular time. Subsequently these records or strip charts may be scrutinized for any one of several reasons, maybe to detect a trend in operation from day to day or hour to hour, or to establish the time when there was some significant change in the operating conditions to which the instrument responds, or for performance comparison, or to secure other information for which the making of record charts is important.

As the record is made, it is generally wound scroll-like onto a rigid hollow core of stiff cardboard or the like, and as so wrapped it is filed for subsequent reference. It is annoying to subsequently examine these charts, since they are generally unrolled across a desk or table. The present invention provides a device especially useful for viewing such charts or similar strip paper records.

It should be pointed out, however, that different recording instruments use charts of different widths, and different instruments or instrument makers use different core diameters. Since one industrial plant may have different instruments in different locations, the viewer of the present invention is adaptable for use with various widths of charts within the common range of sizes and the various core diameters which are encountered.

The present invention provides a simple support for viewing the charts wherein a chart is wound from one core onto another as it is being viewed, and which is adjustable to charts of different widths and cores of various diameters, and in which the charts can be rapidly inserted and removed.

The invention has for its principal object to provide a convenient, inexpensive device for viewing strip charts and other elongated documents and adapted for use with the various widths of charts and core variations encountered in industry.

These and other objects and advantages are secured by my invention, as will be readily understood by those skilled in the art from the following description in conjunction with the accompanying drawings, in which.

Figure 1:
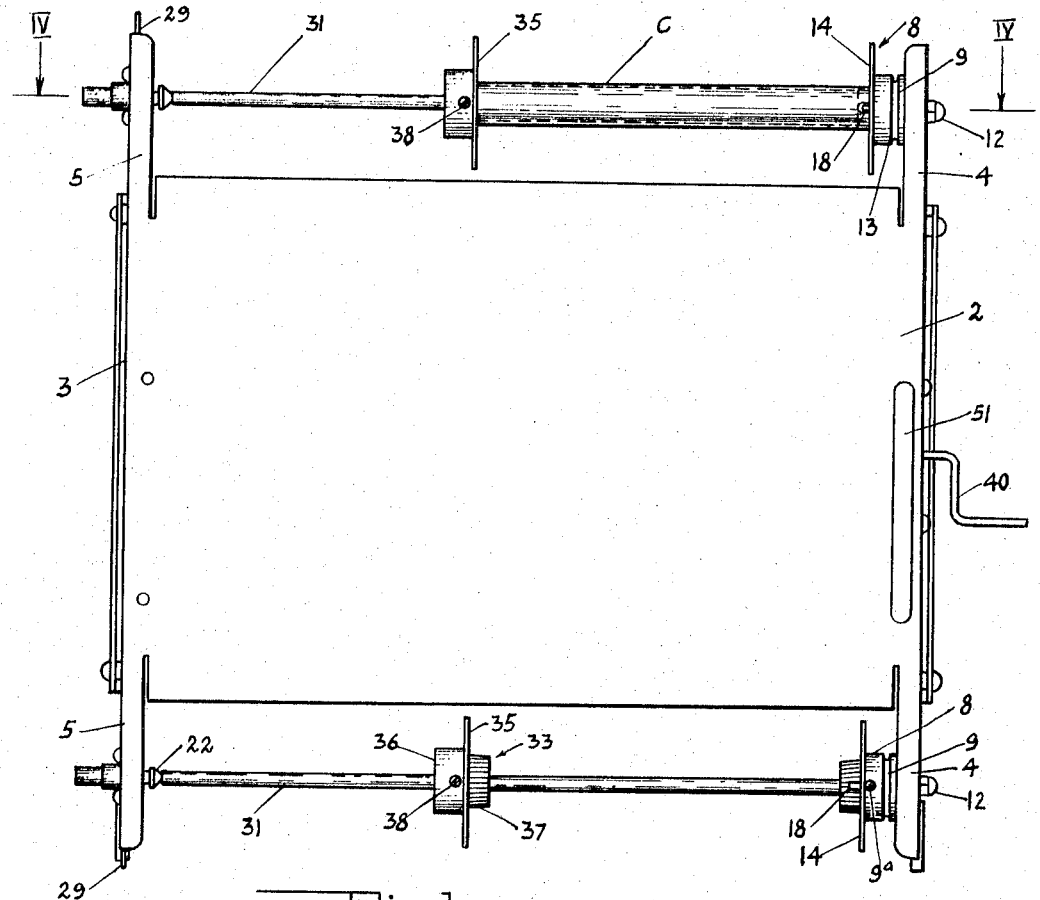
FIG. 1 is a top plan view of a device embodying my invention and showing one core in place in the device.

Referring to the drawings, the device comprises a support preferably stamped and formed from a single piece of sheet metal. It is shaped to provide a central flat panel area 2 over which the chart is moved, and downturned flanges 3 form each side of the support. The sides 3 extend at each end beyond the panel, these extensions on one side being designated 4, and on the other side 5. The ends of the panel are preferably decurved slightly as indicated at 6. The side flanges, including the extensions 4 and 5, have their lower edges turned inwardly toward each other, forming lips 7 to give rigidity to the structure.

There is a flanged drive wheel 8 rotatably mounted on the extension 4 at each end of the supporting structure. This wheel has a hub portion 9 through which passes a flanged shouldered stud 10 with a threaded extension 11 that passes through the panel extension 4 and has a cap nut 12 thereon, the arrangement holding the wheel firmly in place, but enabling it to rotate freely on the stud. As here shown, the hub has a groove 13 in its periphery. The shouldered screw prevents the stud from being pulled too tight to prevent free rotation of the wheel 9. The wheel has a flange 14 extending beyond the hub, and the flanged face of the wheel has a circular recess 15 therein. This recess receives one end of a driving core plug 16 having a projecting portion 17 that is either fluted or has a key lug 18, or both, thereon, while the other end of the plug which enters the recess has a peripheral groove 19 therein. A set screw 9a passing through the hub of the wheel projects into this groove to releasably hold the plug in the recess, and at the same time clamp the plug in the wheel for rotation therewith. With this arrangement the plug may be easily removed and replaced by one with a different diameter projection 17 for engaging a different diameter core. The plug has a central bore 20 therein.

On the opposite side extension 5 at each end of the device there is a centering pin. It has a conical terminal 22 which is centered opposite and is pointed toward the flanged drive wheel 8, a cylindrical portion 23 and a terminal extension 24 passing through the side extension 5 where it is accessible to the operator. The centering pin is retained on the extension by a hollow boss 25 fixed to the extension 5 by a base flange 26 screwed or riveted to the inner face of the extension. The boss has a cylindrical boss 27 in which the cylindrical portion 23 of the pin is axially movable, movement to the left however being limited by the slightly larger diameter of the terminal core 22. The pin may therefore be moved axially toward or away from the flanged drive wheel toward which it points. The cylindrical part 23 has two spaced annular grooves in its periphery. A spring wire 28 is anchored to the frame and has a part 29 forming a handle and a part 30 that is received in a cut-away portion of the boss 25. It serves to releasably hold the pin in a retracted or projected position by engaging in one groove or the other. The groove nearer the conical terminal has the left side tapered while the other groove has square sides. When part 30 of the spring is engaged in the right hand groove, pressure on the extension 24 will cam or raise the wire 30 from the groove, but when the centering pin enters the second groove the pin may only be moved by lifting the handle 29 of the spring latch.

The drive wheel and its core plug 16 and the centering pin provide a support for a core spindle 31 at each end of the machine. This core spindle has one end, 31a, slightly chamfered for easy entry into the bore 20 of the driving plug 16, in which it has a sliding fit, and has a conical recess 31b at its other end into which the pointed end of the centering pin is engaged.

There is a flanged wheel 35 fitted on the spindle and slidable therealong. It has a hub portion 36 through which the spindle passes with a relatively loose fit. The second flanged wheel also has a recess in the flanged face thereof, which is turned toward the flanged drive wheel for receiving a replaceable plain core plug 37 which is like the drive core plug, except that it requires no key lug similar to 18. The spindle 31 has a close sliding fit in this plug. A set screw 38 in the hub of the wheel enters a peripheral groove 39 in the core plug. When set screw 38 is tightened against the plug, it tends to force them out of concentricity with the spindle, thereby creating a binding action serving to hold the wheel and plug against sliding movement on the spindle and lock the assembly in any position along the spindle to which it is adjusted.

On the same side of the machine that has the two flanged drive wheels there is a crank 40 with a shaft that slidably passes through two pulleys 41 and 42 which are similar to each other, but opposite hand, but reversed so that their hubs 43 extend in opposite directions. These hubs have ratchet-like notches or teeth on the ends and the shaft 40 has two pins 44 (only one of which is visible in FIG. 2), which are located respectively at opposite ends of the pulleys so that by shifting the shaft endwise, one or the other pulleys may be driven. One pulley engages a belt, preferably a rubber belt 45 that passes around one of the grooves 13 of one flanged drive wheel 8, and the other a similar crossed belt 46 that similarly engages the other flanged drive wheel. Thus, while the crank may always be turned in one direction, one drive wheel or the other may be driven to move a chart selectively in one direction or the other.

Figures 3, 5:
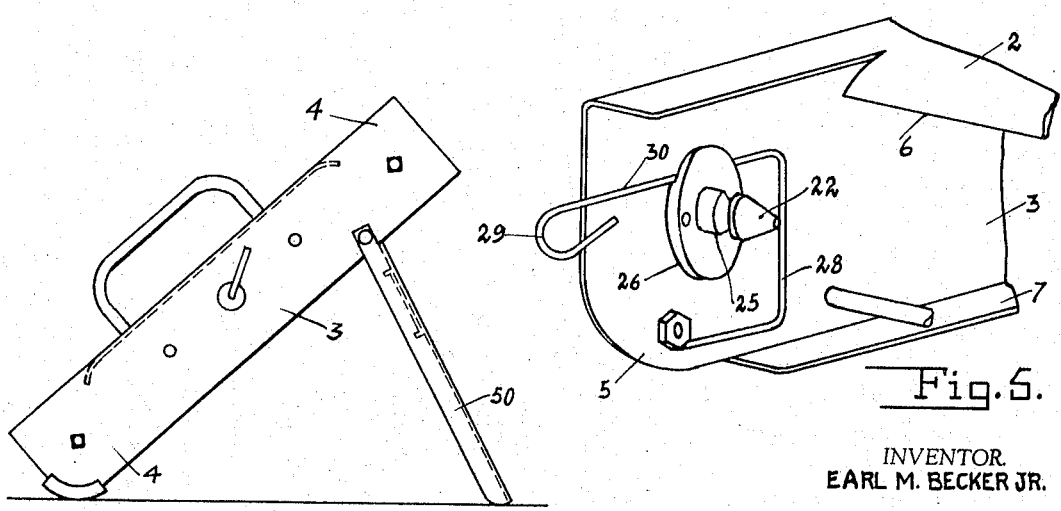
FIG. 3 is a side elevation on a smaller scale showing the viewer with the supporting brace extended for holding it in an inclined position.
FIG. 5 is a fragmentary perspective view of the centering pin.

Mounted on the sides of the frame there is a hinged brace 50 that allows the device to be supported in an inclined position, as shown in FIG. 3, or placed flat on a table.

Figure 2:
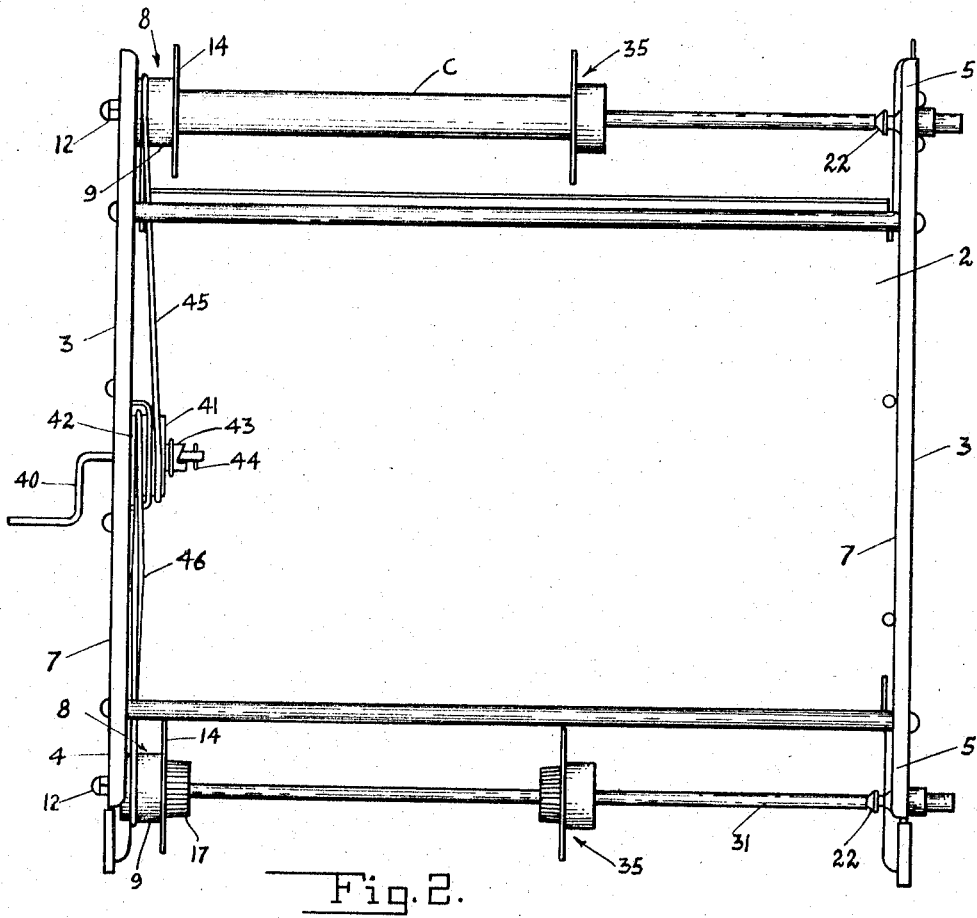
FIG. 2 is a bottom plan view of the device looking at it from the bottom.
Figure 4:
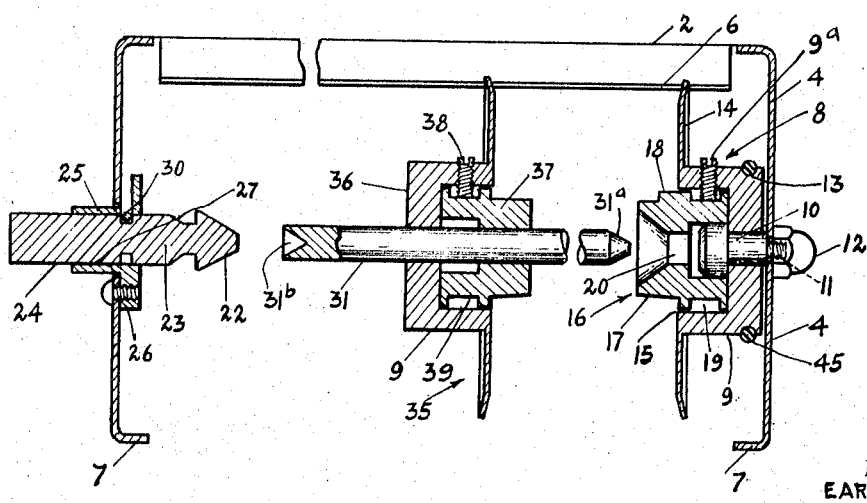
FIG. 4 is a transverse section in the plane of line IV—IV of FIG. 1 and looking in the direction of the arrows, but with the spindle removed and broken away for illustration.

In use, the flanged wheels 35 are adjusted along their respective spindles to the width of the strip chart to be examined. The centering pin 22 at each end of the device is retracted by lifting handle 29 of the spring release wire 28, while grasping and pulling the centering pin terminal. The spindles are then easily removed. Two driving core plugs of the proper size to fit the core of the chart to be viewed are placed, one each, in the recess of the flanged drive wheels and locked in place with the screws 9a so as to rotate with the flanged drive wheels. Corresponding plain core plugs 37 are set in the flanged wheels 35 and set screws 38 are operated to retain these plugs in place. The core of the chart to be viewed is slipped over the spindle and one end telescoped over the plugs 37. The end of the spindle is then inserted in the drive core plug and the key lug 18 enters a notch which already exists in one end of the chart core. Some cores do not have a notch cut in them, these are friction driven by knurled core plug. The centering pin is then moved to engage the recessed end of the spindle. In a similar manner an empty chart core is placed on the other spindle, and the lead end of the chart to be examined is drawn across the panel 2 and attached to the empty core, cellophane pressure tape commonly being used for this purpose. A typical core is shown in FIGS. 1 and 2 and is designated C.

A user having only one type of recording instrument can set his machine for only one size of core and width of chart. A user having several different recording instruments requires four plugs, two driving plugs with keys, or knurls and two plain ones, for each size of core. Once the viewer is set for one size of chart, the removal of the spindles and the replacement of one chart with another requires only a few seconds after one has become familiar with the operation. Hence it becomes feasible, where the record of a given instrument is being viewed, to examine one or several in succession, and to make marks or notes thereon as the record is wound from one core to the other or reversed, the panel giving a rigid backing for making marks or notes.

I have shown a handle 51 at one side of the machine which may be used in carrying it, or steadying it where it is being used.

While I have shown and described one specific embodiment of my invention, it will be understood that various changes in the detail construction and arrangement of parts may be made therein within the contemplation of the invention.

I claim:

1. A strip chart viewer for viewing charts of different widths on cores of different diameters comprising
   (a) a supporting panel,
   (b) a flanged drive wheel at each end of the panel having a recessed face,
   (c) a spindle assembly at each end of the panel, each said spindle assembly comprising
      (1) a spindle,
      (2) a second flange wheel slidable along the spindle and releasably fixed thereto for rotation with the spindle, said second flanged wheel having a recessed face confronting the recessed face of the flanged drive wheel,
      (3) a core plug interchangeable with other core plugs of different core-engaging diameters removably fixed in the recess of the flanged drive wheel with the spindle fitted into the center thereof, said spindle having one end removably engaged in said core plug of the flanged drive wheel, said core plug being arranged with the flanged drive wheel to transmit rotation to the spindle when the drive wheel is rotated,
      (4) a second core plug interchangeable with other core plugs of different core-engaging diameters removably received in the flanged wheel on the spindle, and
   (d) means on the supporting panel centered opposite the flanged drive wheel for releasably supporting the other end of the spindle,
   (e) the supporting panel being so positioned between the spindles that the strip chart being viewed moves over and is supported by the panel when being wound from core plugs associated with one spindle to core plugs associated with the other spindle.

2. A strip chart viewer as defined in claim 1 in which each flanged drive wheel has a hub portion rotatable about a fixed centering pin on the supporting panel, the hub portion having its periphery comprising a belt-engaging pulley portion, and means including a hand crank and belts driven thereby, which belts engage said pulley portions for selectively rotating one or the other of the flanged drive wheels.

3. A strip chart viewer as defined in claim 1 wherein the supporting panel has a flat area between the two spindles over which a strip chart to be examined may be moved, said panel having a downturned side flange at each side thereof, the flanged drive wheels being rotatably supported on the downturned flange at one side of the panels, said means for releasably supporting the other end of the spindle being mounted on the other downturned side flange.

4. A strip chart viewer as defined in claim 1 wherein said last-named means for supporting the other end of the spindle is a centering pin movable toward and away from the opposite flanged drive wheels between an extended and a retracted position, the spindle having a recessed end for cooperation with the centering pin, and means for releasably holding the centering pin in either of said positions, said last-named means comprising resilient wire movable transversely to the axis of the centering pin and selectively movable into and out of a notch in the centering pin.

References Cited

UNITED STATES PATENTS

| | | | |
|---|---|---|---|
| 1,009,829 | 11/1911 | Clark | 242—71.9 |
| 1,402,009 | 1/1922 | Olop | 40—93 |
| 1,629,459 | 5/1927 | Jenkins | 242—68.4 |
| 1,671,724 | 5/1928 | Johancen et al. | 242—68.4 |
| 1,955,489 | 4/1937 | Duncan et al. | 242—68.4 |
| 2,115,912 | 3/1938 | Helmond | 242—71.9 X |
| 3,145,943 | 8/1964 | Grant | 242—67.4 |
| 3,156,427 | 11/1964 | Horta et al. | 242—67.4 |

GEORGE F. MAUTZ, *Primary Examiner.*